(12) United States Patent
Nose

(10) Patent No.: US 11,787,433 B2
(45) Date of Patent: Oct. 17, 2023

(54) CONTROL DEVICE OF VEHICLE AND SYSTEM FOR REDUCING INPUT DURING RUNNING ON WAVY ROAD

(71) Applicant: TOYOTA JIDOSHA KABUSHIKI KAISHA, Toyota (JP)

(72) Inventor: Mai Nose, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 333 days.

(21) Appl. No.: 17/145,797

(22) Filed: Jan. 11, 2021

(65) Prior Publication Data

US 2022/0266846 A1 Aug. 25, 2022

(30) Foreign Application Priority Data

Jan. 10, 2020 (JP) .................................. 2020-003161

(51) Int. Cl.
*B60W 50/12* (2012.01)

(52) U.S. Cl.
CPC ......... *B60W 50/12* (2013.01); *B60W 2520/28* (2013.01); *B60W 2520/30* (2013.01); *B60W 2552/20* (2020.02); *B60W 2554/4041* (2020.02); *B60W 2555/20* (2020.02)

(58) Field of Classification Search
CPC ......... B60W 50/12; B60W 2554/4041; B60W 2552/20; B60W 2555/20; B60W 2520/28; B60W 2520/30
See application file for complete search history.

(56) References Cited

FOREIGN PATENT DOCUMENTS

| JP | 06324138 | * 11/1994 | ............... G01S 5/14 |
| JP | 2012154253 | * 8/2012 | ............. Y02T 10/72 |
| JP | 2012-166676 A | 9/2012 | |
| JP | 2012166676 | * 9/2012 | ............. Y02T 10/62 |
| JP | 2019-108867 A | 7/2019 | |
| JP | 2019108867 | * 7/2019 | ............. F04D 29/02 |
| WO | 2013/175567 A1 | 11/2013 | |

* cited by examiner

*Primary Examiner* — Vivek D Koppikar
*Assistant Examiner* — Joan T Goodbody
(74) *Attorney, Agent, or Firm* — Oliff PLC

(57) ABSTRACT

A control device of a vehicle includes a power transmission device transmitting a power of a power source to drive wheels, the control device comprises: a drive force limiting portion limiting a drive force of the vehicle by an upper limit value when the vehicle is running on a wavy road and a value representing a variation in a predetermined rotation speed of a drive system component disposed between the power source to the drive wheels is equal to or greater than a resonance determination value; an upper limit value setting portion setting the upper limit value to a value corresponding to the wavy road on which the vehicle is currently running, based on current position information indicative of a current position of the vehicle.

13 Claims, 10 Drawing Sheets

CONTROL DEVICE OF VEHICLE AND SYSTEM FOR REDUCING INPUT DURING RUNNING ON WAVY ROAD

This application claims priority from Japanese Patent Application No. 2020-003161 filed on Jan. 10, 2020, the disclosure of which is incorporated herein by reference in its entirety.

FIELD OF THE INVENTION

The present invention relates to a control device of a vehicle including a power transmission device transmitting a power of a power source to drive wheels, and a system for reducing input during running on a wavy road used in the vehicle.

DESCRIPTION OF THE RELATED ART

A vehicle including a power transmission device transmitting a power of a power source to drive wheels is well known. For example, this corresponds to the vehicle described in Japanese Laid-Open Patent Publication No. 2019-108867. Japanese Laid-Open Patent Publication No. 2019-108867 discloses that when a vehicle enters a wavy road, an input to the vehicle is amplified by resonance between the input to the vehicle due to unevenness of a road surface and the natural frequency of the vehicle, a suspension, etc., which applies an overload to a drive system component included in the vehicle, and that when it is determined that the vehicle is running on a wavy road, an output of an engine or a motor is controlled.

SUMMARY OF THE INVENTION

Technical Problem

To suppress an input of excessive torque from drive wheels to drive system components from a power source to drive wheels, and to mounts supporting and fixing the power source, the power transmission device, etc. to a vehicle body, it is conceivable that when the vehicle is running on a wavy road and a value representing a variation in predetermined rotation speed of a drive system component becomes equal to or greater than a resonance determination value, the drive force of the vehicle is limited by an upper limit value. However, since a road surface condition and a running state differ depending on a location of the wavy road, if the upper limit value of the drive force is set uniformly regardless of the location of the wavy road, the upper limit value may deviate from an appropriate value depending on the location of the wavy road, which may make it unable to suppress an excessive input to the drive system components, the mounts, etc., or may deteriorate power performance.

The present invention was conceived in view of the situations and it is therefore an object of the present invention to provide a control device of a vehicle and a system for reducing input during running on a wavy road capable of ensuring power performance while suppressing an excessive input to a drive system component, a mount, etc. regardless of a location of a wavy road.

Solution to Problem

The object indicated above is achieved according to the following aspects of the present invention.

To achieve the above object, a first aspect of the present invention provides a control device of a vehicle including (a) a power transmission device transmitting a power of a power source to drive wheels, the control device comprising: (b) a drive force limiting portion limiting a drive force of the vehicle by an upper limit value when the vehicle is running on a wavy road and a value representing a variation in a predetermined rotation speed of a drive system component disposed between the power source to the drive wheels is equal to or greater than a resonance determination value; (c) an upper limit value setting portion setting the upper limit value to a value corresponding to the wavy road on which the vehicle is currently running, based on current position information indicative of a current position of the vehicle.

A second aspect of the present invention provides the control device of the vehicle recited in the first aspect of the invention, wherein the upper limit value setting portion sets, as the upper limit value, a value of the drive force at which the value representing a variation in the predetermined rotation speed is the resonance determination value in a predetermined characteristic corresponding to a location where the vehicle is currently running, among predetermined characteristics predefined for respective locations where the wavy road exists and indicative of a relationship between the value representing a variation in the predetermined rotation speed and the drive force.

A third aspect of the present invention provides the control device of the vehicle recited in the second aspect of the invention, wherein the predetermined characteristics are predefined based on the values representing variations in the predetermined rotation speed of drive system components of multiple vehicles including the vehicle and a vehicle other than the vehicle, the drive forces of the multiple vehicles, and the current position information, acquired through respective communications from the multiple vehicles in an external device separated from the vehicle.

A fourth aspect of the present invention provides the control device of the vehicle recited in the third aspect of the invention, wherein the upper limit value setting portion sets the upper limit value in consideration of a necessary drive force predefined based on the drive forces of the multiple vehicles and longitudinal accelerations of the multiple vehicles acquired through respective communications from the multiple vehicles in the external device.

A fifth aspect of the present invention provides the vehicle control device recited in any one of the first to fourth aspects of the invention, wherein the upper limit value setting portion sets the upper limit value in consideration of weather information of a location where the vehicle is currently running.

A sixth aspect of the present invention provides the vehicle control device recited in any one of the first to fifth aspects of the invention, wherein the value representing a variation in the predetermined rotation speed is a value obtained by integrating an absolute value of a variation component of the predetermined rotation speed in a resonance frequency band extracted from the predetermined rotation speed for a predetermined period.

A seventh aspect of the present invention provides (a) a system for reducing input during running on a wavy road used for multiple vehicles each including a power transmission device transmitting a power of a power source to drive wheels, the system comprising: (b) an external device separated from the vehicles and setting predetermined characteristics for respective locations where the wavy road exists, based on a value representing a variation in a predetermined rotation speed of a drive system component disposed between the power source to the drive wheels, a drive force of the vehicle, and current position information indicative of a current position of the vehicle acquired through respective communications from the vehicles, the predetermined characteristics indicating a relationship between the value representing a variation in the predetermined rotation speed and the drive force; and (c) a control device mounted on the vehicle and limiting the drive force by an upper limit value when the vehicle is running on the wavy road and the value representing a variation in the predetermined rotation speed is equal to or greater than a resonance determination value, the control device setting as the upper limit value a value of the drive force at which the value representing a variation in the predetermined rotation speed is the resonance determination value in the predetermined characteristic corresponding to a location where the vehicle is currently running, among the predetermined characteristics for the respective locations.

Advantageous Effects of Invention

According to the first aspect of the invention, when the vehicle is running on the wavy road and the value representing the variation in a predetermined rotation speed of the drive system component is equal to or greater than the resonance determination value, the drive force of the vehicle is limited by the upper limit value, and therefore, the input of excessive torque from the drive wheels is suppressed. Additionally, since the upper limit value of the drive force is set to a value corresponding to the wavy road where the vehicle is currently running based on the current position information of the vehicle, an inappropriate reduction or excessive reduction in the drive force is suppressed when the drive force is limited. Therefore, the power performance can be ensured while the excessive input to the drive system components, the mounts, etc. is suppressed regardless of the location of the wavy road.

According to the second aspect of the invention, the upper limit value is set to the value of the drive force at which the value representing the variation in the predetermined rotation speed is the resonance determination value in the predetermined characteristic corresponding to a location where the vehicle is currently running, among the predetermined characteristics predefined for respective locations where the wavy road exists, and therefore, the upper limit value is appropriately set to a value corresponding to the wavy road where the vehicle is currently running.

According to the third aspect of the invention, the predetermined characteristics are predefined based on the values representing variations in the predetermined rotation speed, the drive force, and the current position information acquired through respective communications from each of multiple vehicles in the external device, and therefore, the upper limit value corresponding to the wavy road is appropriately set by using the predetermined characteristics.

According to the fourth aspect of the invention, since the upper limit value is set in consideration of the necessary drive force predefined based on the drive forces and longitudinal accelerations acquired through respective communications from the multiple vehicles in the external device, an inappropriate reduction or excessive reduction in the drive force is suppressed when the drive force is limited.

According to the fifth aspect of the invention, since the upper limit value is set in consideration of the weather information in the location where the vehicle is currently running, the corrected upper limit value reflecting a change in the friction coefficient of the wavy road due to the weather is appropriately set.

According to the sixth aspect of the invention, the value representing a variation in the predetermined rotation speed is a value obtained by integrating the absolute value of the variation component in the resonance frequency band extracted from the predetermined rotation speed for the predetermined period, and therefore, an appropriate determination can be made on a state in which the drive force of the vehicle needs to be limited by the upper limit value, for example, a state in which resonance is occurring.

According to the seventh aspect of the invention, when the vehicle is running on a wavy road and a value representing a variation in predetermined rotation speed of the drive system component is equal to or greater than a resonance determination value, the drive force of the vehicle is limited by the upper limit value, so that the input of excessive torque from the drive wheels is suppressed. Additionally, the external device sets predetermined characteristics indicative of a relationship between the value representing a variation in a predetermined rotation speed and the drive force for respective locations where the wavy road exists, based on the value representing a variation in the predetermined rotation speed, a drive force, and current position information acquired through respective communications from multiple vehicles, and sets as the upper limit value a value of the drive force at which the value representing a variation in the predetermined rotation speed is the resonance determination value in the predetermined characteristic corresponding to a location where the vehicle is currently running, among the predetermined characteristics set for the respective locations, and therefore, the upper limit value of the drive force is appropriately set by using this predetermined characteristic to a value corresponding to the wavy road where the vehicle is currently running, so that an inappropriate reduction or excessive reduction in the drive force is suppressed when the drive force is limited. Therefore, the power performance can be ensured while the excessive input to the drive system components, the mounts, etc. is suppressed regardless of the location of the wavy road.

MODES FOR CARRYING OUT THE INVENTION

In an embodiment of the present invention, for example, the power source is an engine such as a gasoline engine or a diesel engine generating power from combustion of fuel. The vehicle may include an electric motor etc. as the power source in addition to or instead of the engine.

The power transmission device includes a transmission, for example. This transmission is, for example, a known planetary gear type automatic transmission, a known synchronous meshing type parallel two-axis automatic transmission, a known DCT (dual clutch transmission) that is the synchronous meshing type parallel two-shaft automatic transmission including two systems of input shafts, a known belt type continuously variable transmission, a known electric continuously variable transmission, a known automatic transmission having multiple power transmission paths, which are a first power transmission path via a gear transmission mechanism and a second power transmission path via a continuously variable transmission, disposed in parallel on a power transmission path between an input rotating member and an output rotating member, a known synchronous meshing type parallel two-axis manual transmission, etc. Alternatively, in a vehicle in which only the electric motor is mechanically coupled to the drive wheels in a power transmittable manner, the power transmission device may not include the transmission, for example.

The predetermined rotation speed of the drive system component from the power source to the drive wheels is, for example, a wheel speed that is the rotation speed of the drive wheels, a rotation speed of a drive shaft, etc. Alternatively, in a vehicle including the transmission, for example, the predetermined rotation speed is an output rotation speed of the transmission corresponding to a vehicle speed, or an input rotation speed of the transmission. Alternatively, in a vehicle including the electric motor, for example, the predetermined rotation speed is a rotation speed of the electric motor. Alternatively, in a vehicle including a fluid transmission device such as a torque converter, for example, the predetermined rotation speed is an output rotation speed of the fluid transmission device, i.e., a turbine rotation speed.

The location is, for example, an area such as a country used as a unit, an area such as Asia, Europe, or the United States used as a unit, or an area such as an urban area, a suburb, or a mountainous area used as a unit. The location is synonymous with a region.

Examples of the present invention will now be described in detail with reference to the drawings.

Example 1

Figure 1:
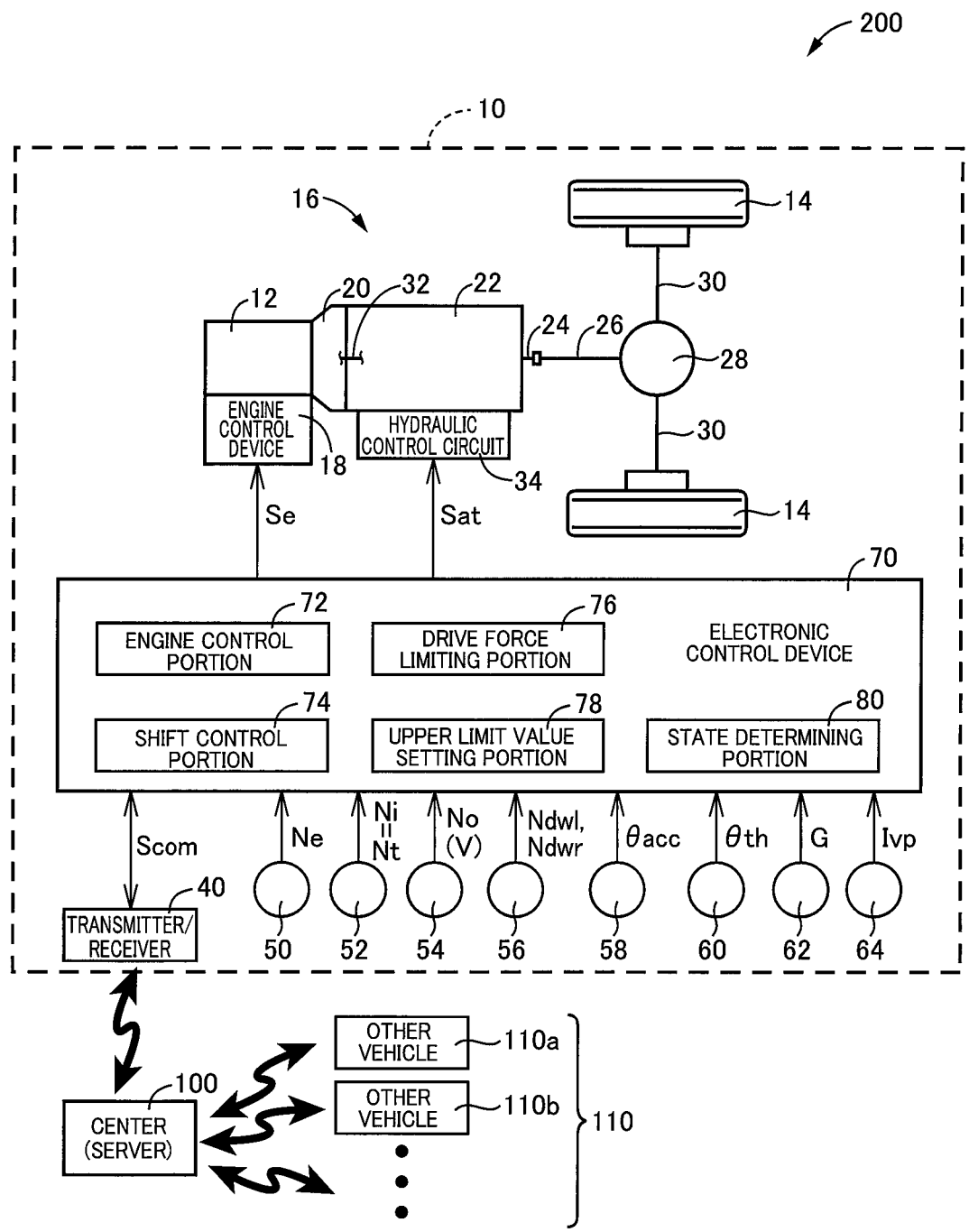
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control function and a control system for various controls in the vehicle 10. In FIG. 1, the vehicle 10 includes an engine 12, drive wheels 14, and a power transmission device 16 transmitting the power of the engine 12 to the drive wheels 14.

The engine 12 is a power source for running of the vehicle 10 and is a known internal combustion engine, for example. The engine 12 has an engine torque Te, which is an output torque of the engine 12, controlled by an electronic control device 70 described later controlling an engine control device 18 such as a throttle actuator, a fuel injection device, and an ignition device included in the vehicle 10.

The power transmission device 16 includes a torque converter 20 coupled to the engine 12, an automatic transmission 22 coupled to the torque converter 20, a propeller shaft 26 coupled to an AT output shaft 24 that is an output rotating member of the automatic transmission 22, a differential gear 28 coupled to the propeller shaft 26, a pair of drive shafts 30 coupled to the differential gear 28, etc. In the power transmission device 16, the power output from the engine 12 is transmitted to the drive wheels 14 sequentially via the torque converter 20, the automatic transmission 22, the propeller shaft 26, the differential gear 28, the drive shaft 30, etc. The power is synonymous with torque and force if not particularly distinguished.

The torque converter 20 is a fluid transmission device transmitting the power of the engine 12. A pump impeller is an input rotating member of the torque converter 20 and is coupled to the engine 12. A turbine impeller is an output rotating member of the torque converter 20 and is coupled to an AT input shaft 32 that is an input rotating member of the automatic transmission 22. The AT input shaft 32 is also a turbine shaft.

The automatic transmission 22 is a transmission constituting a portion of a power transmission path between the engine 12 and the drive wheels 14. The automatic transmission 22 is a known planetary gear type automatic transmission including one set or multiple sets of planetary gear devices and multiple engaging devices, for example. The automatic transmission 22 has an operation state such as an engaged state and a released state of the engaging devices switched by a hydraulic pressure supplied from a hydraulic control circuit 34 included in the vehicle 10 and controlled by the electronic control device 70 described later. As a result, the automatic transmission 22 has multiple gearshift positions different in speed change ratio γ (=AT input rotation speed Ni/AT output rotation speed No) selectively formed. The AT input rotation speed Ni is the rotation speed of the AT input shaft 32, i.e., the input rotation speed of the automatic transmission 22, and has the same meaning as a turbine rotation speed Nt. The AT output rotation speed No is the rotation speed of the AT output shaft 24, i.e., the output rotation speed of the automatic transmission 22.

The vehicle 10 includes a transmitter/receiver 40. The transmitter/receiver 40 is a device existing separately from the vehicle 10 and communicating with a center 100 serving as an external device separated from the vehicle 10. The electronic control device 70 described later transmits/receives various types of information to/from the center 100 via the transmitter/receiver 40. The center 100 is a server receiving, processing, analyzing, storing, and providing various types of information. The center 100 transmits/receives various types of information to/from vehicles 110a, 110b, . . . (referred to as the other vehicles 110 if not particularly distinguished) other than the vehicle 10 as in the case of the vehicle 10. Therefore, the center 100 transmits/receives various types of information to/from a plurality of vehicles including the vehicle 10 and the other vehicles 110. In this example, the plurality of vehicles is referred to as the multiple vehicles. The other vehicles 110 basically has the same function as the vehicle 10. The transmitter/receiver 40 may have a function of directly performing vehicle-to-vehicle communication with the other vehicles 110 in the vicinity of the vehicle 10 without via the center 100.

The vehicle 10 further includes the electronic control device 70 as a controller including a control device of the vehicle 10. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. The electronic control device 70 includes respective computers for engine control, transmission control, etc., as needed.

The electronic control device 70 is supplied with various signals (e.g., an engine rotation speed Ne that is the rotation speed of the engine 12, the turbine rotation speed Nt (=AT input rotation speed Ni), the AT output rotation speed No corresponding to a vehicle speed V, wheel speeds Ndwl, Ndwr that are respective rotation speeds Ndw of the left and right drive wheels 14, an accelerator opening degree θacc defined as a driver's accelerating operation amount representing a magnitude of an accelerating operation of the driver, a throttle valve opening degree θth that is an opening degree of an electronic throttle valve driven by a throttle actuator, a longitudinal acceleration G of the vehicle 10, position information Ivp, and a communication signal Scom) based on detection values and acquired information from various sensors and various devices included in the vehicle 10 (e.g., an engine rotation speed sensor 50, a turbine rotation speed sensor 52, an output rotation speed sensor 54, each of wheel speed sensors 56, an accelerator opening degree sensor 58, a throttle valve opening degree sensor 60, a G sensor 62, a position sensor 64, and the transmitter/receiver 40). The electronic control device 70 outputs to the devices included in the vehicle 10 (e.g., the engine control device 18, the hydraulic control circuit 34, the transmitter/receiver 40) various command signals (e.g., an engine control command signal Se for controlling the engine 12, a transmission control command signal Sat for controlling the automatic transmission 22, and a communication signal Scom).

The position sensor 64 includes a GPS antenna etc. The position information Ivp includes current position information indicative of the current position of the vehicle 10 on the surface of the earth or a map based on GPS signals (orbit signals) transmitted by GPS (Global Positioning System) satellites.

The communication signal Scom includes running information of the vehicle 10 transmitted to/received from the center 100, for example. Additionally or alternatively, the communication signal Scom includes the vehicle-to-vehicle communication information directly transmitted to/received from the other vehicles 110 in the vicinity of the vehicle 10 without via the center 100, for example. The running information includes information such as the vehicle speed V, the wheel speeds Ndwl, Ndwr, the accelerator opening degree θacc, the longitudinal acceleration G, the position information Ivp, the speed change ratio γ or the gearshift position of the automatic transmission 22, a drive force Fd, and the engine torque Te, for example. For example, the drive force Fd is a target drive force Fdtgt or an estimated drive force Fdest. For example, the engine torque Te is a target engine torque Tetgt or an estimated engine torque Teest. The estimated drive force Fdest and the estimated engine torque Teest are values respectively corresponding to actual values.

To implement the various controls in the vehicle 10, the electronic control device 70 includes an engine control means, i.e., an engine control portion 72, a shift control means, i.e., a shift control portion 74, and a drive force limiting means, i.e., a drive force limiting portion 76.

The engine control portion 72 applies the accelerator opening degree θacc and the vehicle speed V to, for example, a drive force map that is a relationship obtained empirically or through design and stored in advance, i.e., a predefined relationship, and thereby calculates an amount of drive request from the driver to the vehicle 10. This amount of drive request is, for example, a required drive force Fddem demanded from the driver to the vehicle 10. A required drive torque etc. may be used instead of the required drive force Fddem. From a different point of view, this required drive torque is a required drive power at the current vehicle speed V. Alternatively, the AT output rotation speed No etc. may be used instead of the vehicle speed V. The engine control portion 72 sets the target drive force Fdtgt for achieving the required drive force Fddem and calculates the target engine torque Tetgt of the engine 12 for obtaining the target drive force Fdtgt based on a transmission loss, a load of auxiliary machines, the reduction ratio of the differential gear 28, the speed change ratio γ of the automatic transmission 22, etc. The engine control portion 72 outputs to the engine control device 18 the engine control command signal Se for controlling the engine 12 so that the target engine torque Tetgt is obtained.

The electronic control device 70 applies the actual throttle valve opening degree θth and the engine rotation speed Ne to a predefined engine torque map, for example, and thereby calculates an estimated engine torque Teest that is an estimated value of the engine torque Te. The electronic control device 70 calculates an estimated drive force Fdest that is an estimated value of the drive force Fd, based on the estimated engine torque Teest, the reduction ratio of the differential gear 28, the speed change ratio γ of the automatic transmission 22, etc.

The transmission control portion 74 determines a shift of the automatic transmission 22 by using a shift map that is a predefined relationship, for example, and outputs to the hydraulic control circuit 34 the transmission control command signal Sat for providing the shift control of the automatic transmission 22 as needed. The shift map is a predetermined relationship having a shift line for determining the shift of the automatic transmission 22 on two-dimensional coordinates having the vehicle speed V and the required drive force Fddem as variables, for example.

If the vehicle 10 runs on a wavy road etc. and thereby causes the drive wheels 14 to repeatedly slip and grip so that, for example, variations in the wheel speeds Ndwl and Ndwr, i.e., wheel speed variations, increase, a phenomenon called unspring resonance may occur in the power transmission path between the engine 12 and the drive wheels 14, and torsional vibrations due to the wheel speed variations amplified by the resonance may be transmitted from the drive wheels 14 toward the engine 12 on the upstream side. Therefore, at the time of passing through the unspring resonance during running on a wavy road etc., a large torque variation may be input from the drive wheels 14 to drive system components from the engine 12 to the drive wheels 14, and mounts etc. supporting and fixing the engine 12, the power transmission device 16, etc. to a vehicle body. When a large torque variation is input from the drive wheels 14, a large reaction force is generated in the mounts, for example.

This may adversely affect the durability of the drive system components and the mounts. The drive system components are devices and components constituting the power transmission device 16, for example, and may include the engine 12 etc.

The drive force limiting portion 76 limits the drive force Fd of the vehicle 10 by an upper limit value β so as to suppress the input of the torque variation due to the resonance as described above. For example, when the required drive force Fddem is larger than the upper limit value β, the engine control portion 72 sets the target drive force Fdtgt to the upper limit value β to provide a torque down control for reducing the engine torque Te.

Figure 2:
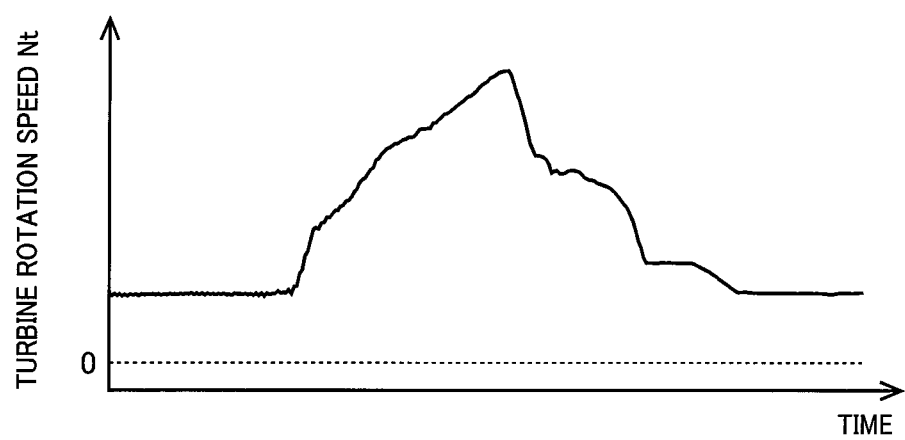
FIG. 2 is a time chart showing an example of a change in the turbine rotation speed.
Figure 3:
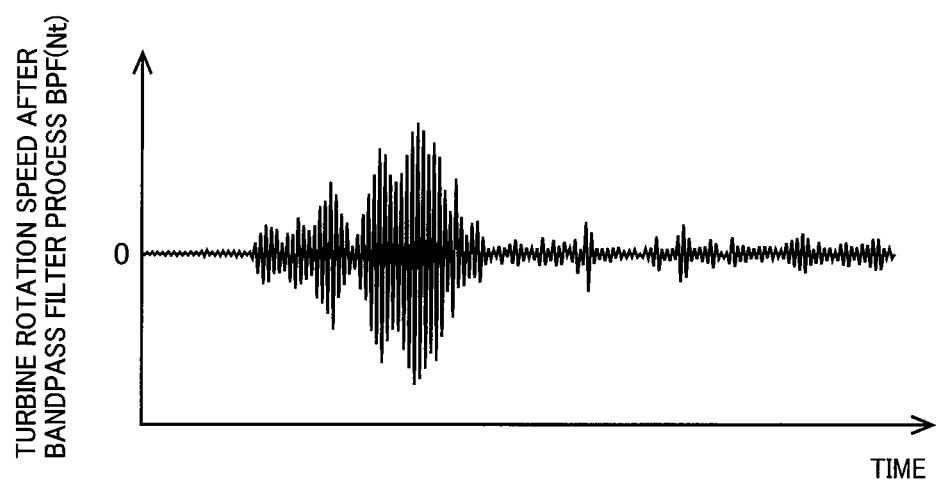
FIG. 3 is a time chart showing an example of a variation component of the turbine rotation speed shown in FIG. 2.
Figure 4:
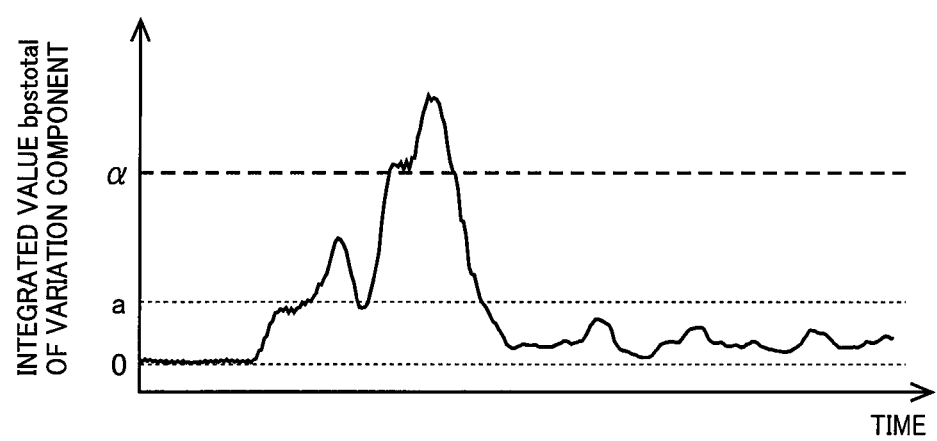
FIG. 4 is a time chart showing an example of an integrated value of the variation component of the turbine rotation speed shown in FIG. 3.

Specifically, FIG. 2 is a time chart showing an example of a change in the turbine rotation speed Nt. FIG. 3 is a time chart showing an example of a variation component of the turbine rotation speed Nt shown in FIG. 2. FIG. 4 is a time chart showing an example of an integrated value of the variation component of the turbine rotation speed Nt shown in FIG. 3. In FIG. 2, the change in the turbine rotation speed Nt used as a predetermined rotation speed of the drive system component shows a state of accelerated running, for example. In FIG. 3, the variation component of the turbine rotation speed Nt indicates the variation component of the turbine rotation speed Nt after a bandpass filter process, i.e., an NT variation component BPF(Nt). This bandpass filter process is a process of extracting a variation amount of the turbine rotation speed Nt in the frequency band causing a resonance in the power transmission device 16. Therefore, the NT variation component BPF(Nt) is a variation component of the turbine rotation speed Nt in the resonance frequency band extracted from the turbine rotation speed Nt that is a detection value of the turbine rotation speed sensor 52. In FIG. 4, an integrated value bpstotal of the NT variation component BPF(Nt), i.e., the NT variation component integrated value bpstotal, is a value obtained by integrating the absolute value of the NT variation component BPF(Nt) for a predetermined period. Therefore, the NT variation component integrated value bpstotal is a value obtained by integrating N (=predetermined period/sampling cycle) pieces of data of the absolute value of the NT variation component BPF(Nt) in the predetermined period. This predetermined period is, for example, a predefined period in which the NT variation component integrated value bpstotal becomes suitable for determining wavy road running. The NT variation component integrated value bpstotal is a value representing the variation in the turbine rotation speed Nt used for determination of the wavy road running. In FIG. 4, "a" is a predefined wavy road determination value for determining that the vehicle 10 is running on a wavy road. In FIG. 4, "a" is a predefined resonance determination value for determining that the vehicle 10 is in a resonance state during wavy road running. When the NT variation component integrated value bpstotal becomes equal to or greater than the resonance determination value α while the vehicle 10 is running on a wavy road, the drive force Fd is limited by the upper limit value β.

Figure 5:
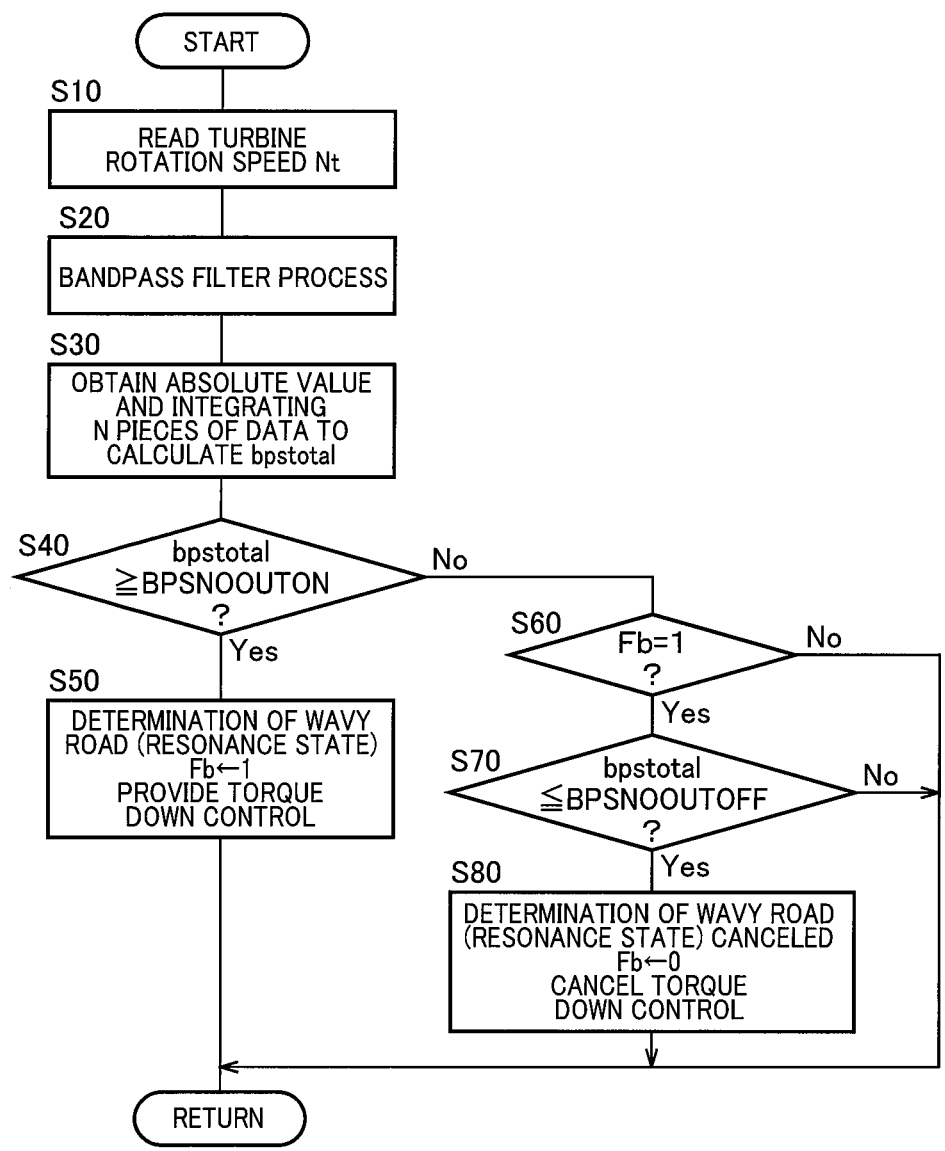
FIG. 5 is a flowchart for explaining a main portion of the control operation of the electronic control device, i.e., a flow chart for explaining the control operation for determining a resonance state in the wavy road running and limiting the drive force.

FIG. 5 is a flowchart for explaining a main portion of the control operation of the electronic control device 70, i.e., a flow chart for explaining the control operation for determining a resonance state in the wavy road running and limiting the drive force Fd, and is repeatedly executed during running, for example. Steps of FIG. 5 correspond to functions of the drive force limiting portion 76.

In FIG. 5, first, at step (hereinafter, step is omitted) S10, the turbine rotation speed Nt is read (see FIG. 2). At S20, the bandpass filter process is executed for the turbine rotation speed Nt to extract the NT variation component BPF(Nt) (see FIG. 3). At S30, N pieces of data of the absolute value of the NT variation component BPF(Nt) are integrated to calculate the NT variation component integrated value bpstotal (see FIG. 4). At S40, it is determined whether the NT variation component integrated value bpstotal is equal to or greater than a threshold value BPSNOOUTON. The threshold value BPSNOOUTON is the resonance determination value α. If the determination of S40 is affirmative, it is determined at S50 that the vehicle is in a resonance state on a wavy road, and a flag Fb is set to "1". Additionally, the drive force Fd is limited by the upper limit value β and, for example, the torque down control is provided. If the determination of S40 is negative, it is determined at S60 whether the flag Fb is "1". If the determination of S60 is negative, this routine is terminated. If the determination of S60 is affirmative, it is determined at S70 that the NT variation component integrated value bpstotal is equal to or less than a threshold value BPSNOOUTOFF. The threshold value BPSNOOUTOFF is a value reduced from the resonance determination value α by an amount for preventing a hunting in determination of the resonance state. If the determination of S70 is negative, this routine is terminated. If the determination of S70 is affirmative, the determination of the resonance state on the wavy road is canceled at S80, and the flag Fb is set to "0". Additionally, the limitation of the drive force Fd by the upper limit value β is canceled and, for example, the torque down control is canceled. As described above, when the vehicle 10 is running on the wavy road and the NT variation component integrated value bpstotal is equal to or greater than the resonance determination value α, the drive force limiting portion 76 limits the drive force Fd of the vehicle 10 by the upper limit value β.

When the wavy road is different, the road surface condition of the wavy road may be different, and the running state may be different in a location where the wavy road exists. Therefore, if the upper limit value β of the drive force Fd is set to a uniform value, the upper limit value β may be set to a value too large to suppress an excessive input to the drive system components, the mounts, etc., or to a value too small for an excessive input, depending on the location of the wavy road, which may deteriorate a power performance.

To implement a control function of ensuring a power performance while suppressing an excessive input to the drive system components, the mounts, etc. regardless of the location of the wavy road, the electronic control device 70 further includes an upper limit value setting means, i.e., an upper limit value setting portion 78, and a state determining means, i.e., a state determining portion 80.

The upper limit value setting portion 78 sets the upper limit value β to a value corresponding to the wavy road on which the vehicle 10 is currently running, based on the position information Ivp. The upper limit value setting portion 78 sets the upper limit value β to a value corresponding to an increase rate of the NT variation component integrated value bpstotal on the wavy road where the vehicle 10 is currently running. When the increase rate of the NT variation component integrated value bpstotal is small, the upper limit value setting portion 78 sets the upper limit value β to a larger value as compared to when the increase rate is large. The increase rate of the NT variation component integrated value bpstotal is a rate of change when the NT variation component integrated value bpstotal increases toward the resonance determination value α.

Figure 6:
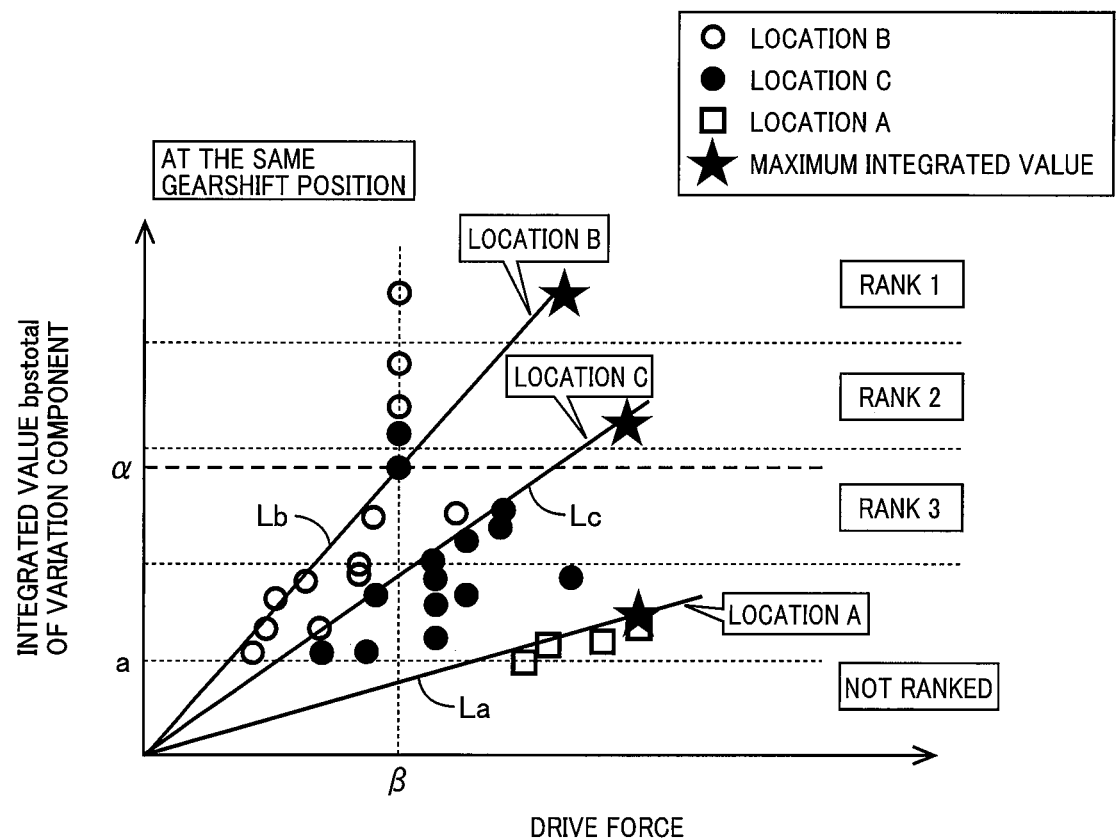
FIG. 6 is a diagram showing an example of predetermined characteristics for each location, indicative of a relationship between the NT variation component integrated value and the drive force.

Specifically, FIG. 6 is a diagram showing an example of predetermined characteristics for each location, indicative of a relationship between the NT variation component integrated value bpstotal and the drive force Fd at the same gearshift position of the automatic transmission 22. The predetermined characteristics are wavy road lines LW predefined for respective locations where the wavy road exists, based on the NT variation component integrated value bpstotal, the drive force Fd, and the position information Ivp acquired through respective communications from multiple vehicles including the vehicle 10 and the other vehicles 110 in the center 100. In FIG. 6, a solid line La is a wavy road line LWa in a location A, a solid line Lb is a wavy road line LWb in a location B, and a solid line Lc is a wavy road line LWc in a location C. Additionally, "□", "○", and "•" are plotted (entered) on the diagram as positions of points indicated by the NT variation component integrated value bpstotal and the drive force Fd. The wavy road line LWa is an approximate line based on the points "□" in the location A, the wavy road line LWb is an approximate line based on the points "○" in the location B, and the wavy road line LWc is an approximate line based on the points "•" in the location C. The NT variation component integrated value bpstotal at each of the points "□", "○", and "•" is the maximum value of the NT variation component integrated value bpstotal when the NT variation component integrated value bpstotal becomes equal to or greater than the wavy road determination value $\alpha$ for a certain period of time or longer. The drive force Fd at each of the points "□", "○", and "•" is, for example, a peak value of the estimated drive force Fdest in a period of several seconds before and after the time of occurrence of the maximum value of the NT variation component integrated value bpstotal. The center 100 collects the NT variation component integrated value bpstotal and the running information in a period of several seconds before and after the time of occurrence of the maximum value of the NT variation component integrated value bpstotal. Since the estimated drive force Fdest does not always reach the peak value at the time of the maximum value of the NT variation component integrated value bpstotal, the running information in a period of several seconds before and after the time of occurrence of the maximum value is collected. For each of the locations, "★" indicates a predicted value of the maximum value of the NT variation component integrated value bpstotal. Although the "★" of each location may deviate from each of the wavy road lines LW since the drive force Fd is limited by the upper limit value $\beta$ when the NT variation component integrated value bpstotal becomes equal to or greater than the resonance determination value $\alpha$, the center 100 predicts the "★" of each location by an extrapolation method.

Figure 7:
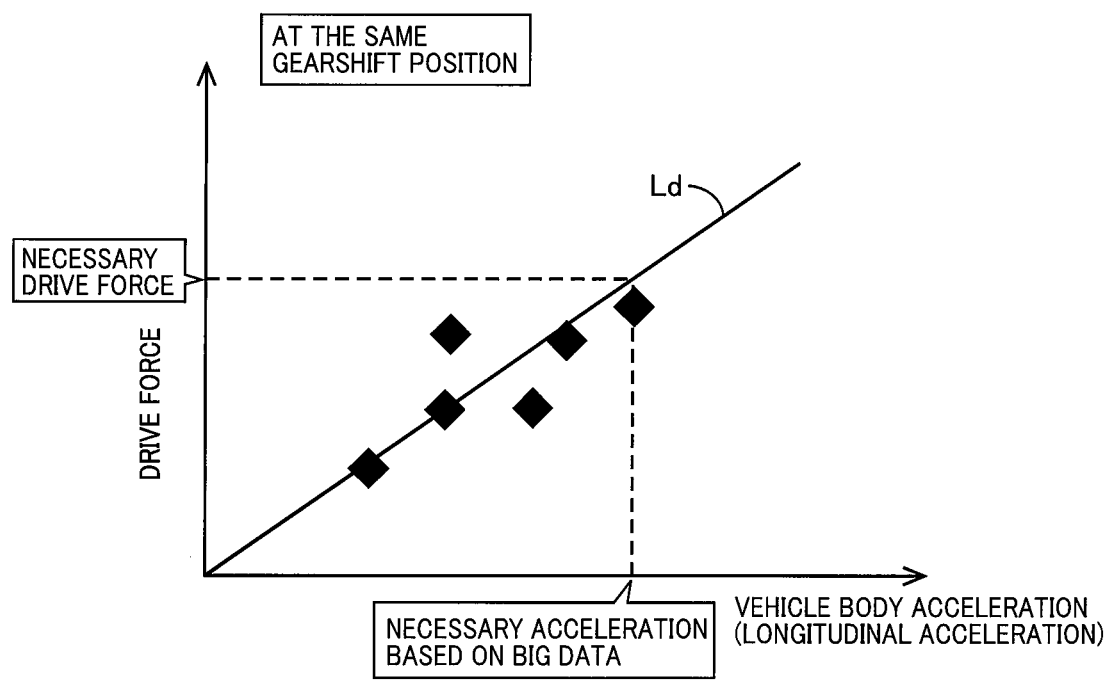
FIG. 7 is a diagram showing an example of a relationship between the drive force and the longitudinal acceleration.

FIG. 7 is a diagram showing an example of a relationship between the drive force Fd and the longitudinal acceleration G at the same gearshift position of the automatic transmission 22. In FIG. 7, "♦" is plotted on the diagram as a position of a point indicated by the drive force Fd and the longitudinal acceleration G The drive force Fd at "♦" is, for example, a peak value of the estimated drive force Fdest in a period of several seconds before and after the time of occurrence of the maximum value of the NT variation component integrated value bpstotal. The longitudinal acceleration G at "♦" is the longitudinal acceleration G at the time of occurrence of the peak value of the estimated drive force Fdest. A solid line Ld is an approximate line based on the point "♦" determined in the center 100 for each location. The center 100 creates a frequency distribution of the longitudinal acceleration G as big data acquired through respective communications from the multiple vehicles including the vehicle 10 and the other vehicles 110, and calculates a value that is two to three times the standard deviation a of the longitudinal acceleration G (=mean value of the longitudinal acceleration G+(2 to 3σ)) as a necessary acceleration. The center 100 sets the value of the drive force Fd at which the longitudinal acceleration G is the necessary acceleration on the solid line Ld, to a necessary drive force $\beta$ncs for each location. In this way, the necessary drive force $\beta$ncs is predefined based on the drive force Fd and the longitudinal acceleration G acquired through respective communications from the multiple vehicles including the vehicle 10 and the other vehicles 110 in the center 100.

Figure 8:
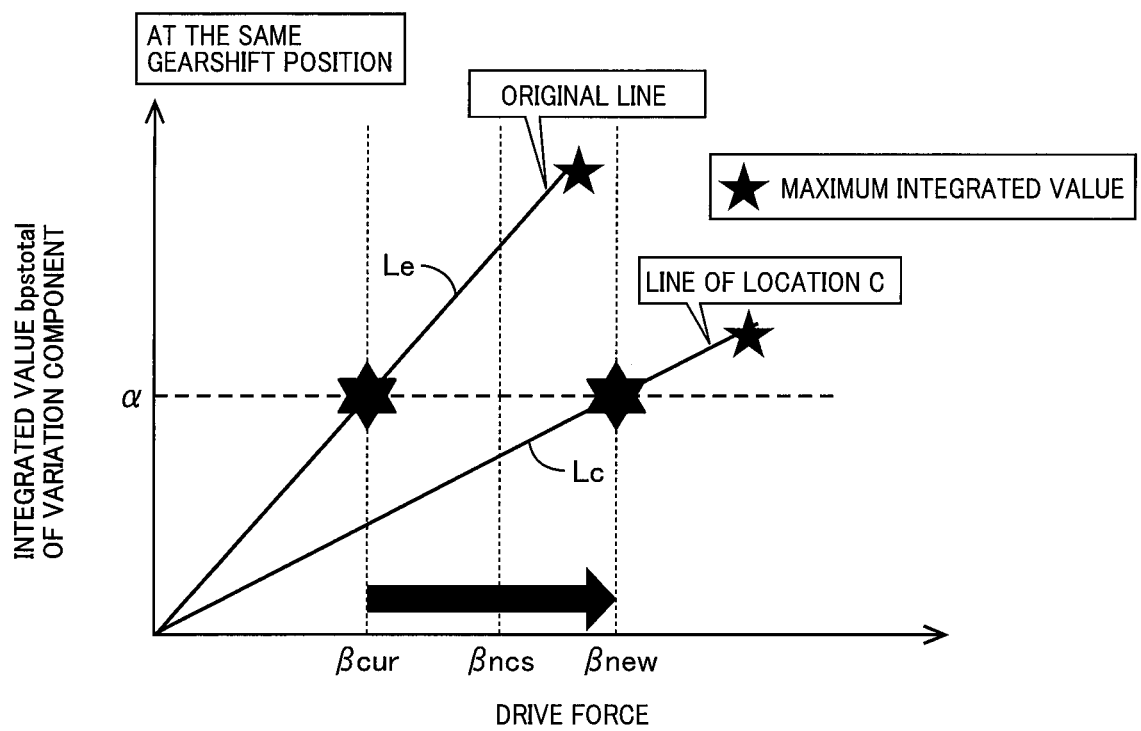
FIG. 8 is a diagram for explaining an example of setting the upper limit value according to the wavy road.

FIG. 8 is a diagram for explaining an example of setting the upper limit value $\beta$ according to the wavy road at the same gearshift position of the automatic transmission 22. In FIG. 8, the solid line Lc is a wavy road line LWc in the location C similar to the solid line Lc of FIG. 6. The upper limit value setting portion 78 acquires from the center 100 the wavy road line LWc in the location C where the vehicle 10 is currently running, among the wavy road lines LW predefined by the center 100 for each location where the wavy road exists, based on the position information Ivp. A solid line Le is an original wavy road line LWe predefined according to a road surface condition of a wavy road and a running state on a wavy road where the NT variation component integrated value bpstotal tends to increase. Therefore, the wavy road line LWe is the wavy road line LW based on the assumption that the NT variation component integrated value bpstotal hardly becomes higher than the wavy road line LWe in the market. "$\beta$cur" is a value of the drive force Fd at which the NT variation component integrated value bpstotal is the resonance determination value $\alpha$ on the original wavy road line LWe, and is the upper limit value $\beta$ predefined by using the wavy road line LWe or, for example, the upper limit value $\beta$ at the current time, i.e., a current upper limit value $\beta$cur. When the vehicle 10 is running in the location C, the new upper limit value $\beta$, i.e., a new upper limit value $\beta$new, is set as the value of the drive force Fd at which the NT variation component integrated value bpstotal is the resonance determination value $\alpha$ on the wavy road line LWc. Therefore, when the vehicle 10 is running in the location C, the new upper limit value $\beta$new is set by using the wavy road line LWc.

The state determining portion 80 compares the values of the current upper limit value $\beta$cur, the new upper limit value $\beta$new, and the necessary drive force $\beta$ncs. For example, the state determining portion 80 determines whether "the current upper limit value $\beta$cur<the necessary drive force $\beta$ncs<the new upper limit value $\beta$new" is satisfied. The state determining portion 80 also determines whether "the necessary drive force $\beta$ncs<the current upper limit value $\beta$cur" is satisfied. The state determining portion 80 determines whether the current upper limit value $\beta$cur is larger than a value that is three times the standard deviation a of the necessary drive force $\beta$ncs as big data calculated by the center 100 (=mean value of the necessary drive force $\beta$ncs+3σ). The new upper limit value $\beta$ is the upper limit value $\beta$ calculated by the upper limit value setting portion 78 by using the wavy road line LW in the location where the vehicle 10 is currently running, which is acquired from the center 100. The necessary drive force $\beta$ncs is the necessary drive force $\beta$ncs in the location where the vehicle 10 is currently running, which is obtained from the center 100. Since the current upper limit value $\beta$cur is the upper limit value $\beta$ obtained by using the original wavy road line LWe in this example, it is assumed that "the current upper limit value $\beta$cur<the new upper limit value $\beta$new" is satisfied.

If the state determining portion 80 determines that "the current upper limit value $\beta$cur<the necessary drive force βncs<the new upper limit value βnew" is satisfied, the upper limit value setting portion 78 changes the upper limit value β from the current upper limit value βcur to the new upper limit value βnew (see FIG. 8). In this way, the upper limit value setting portion 78 sets, as the upper limit value β, the new upper limit value βnew that is the value at which the NT variation component integrated value bpstotal is the resonance determination value α on the wavy road line LW in the location where the vehicle 10 is currently running, among the wavy road lines LW predefined by the center 100 for respective locations where the wavy road exists. In this case, the upper limit value setting portion 78 sets the upper limit value β in consideration of the necessary drive force βncs predefined by the center 100 for each of the locations where the wavy road exists.

If the state determining portion 80 determines that "the current upper limit value βcur<the necessary drive force βncs<the new upper limit value βnew" is not satisfied and determines that "the necessary drive force βncs<the current upper limit value βcur" is satisfied, the upper limit value setting portion 78 does not change the upper limit value β and keeps the current upper limit value βcur. However, in this case, if the state determining portion 80 further determines that the current upper limit value βcur is larger than a value three times the standard deviation a of the necessary drive force βncs, the upper limit value setting portion 78 may change the upper limit value β from the current upper limit value βcur to the necessary drive force βncs.

If "the current upper limit value βcur<the necessary drive force βncs<the new upper limit value βnew" is not satisfied and "the necessary drive force βncs<the current upper limit value βcur" is not satisfied, this means that "the new upper limit value βnew<the necessary drive force βncs" is satisfied. However, since the torque down control is provided so that the drive force Fd does not exceed the upper limit value β, "the new upper limit value βnew<the necessary drive force βncs" is not achieved. However, if the driver performs an operation of increasing acceleration after the upper limit value β has been changed to the new upper limit value βnew so that the drive force Fd equal to or higher than the new upper limit value βnew is required in many situations, "the new upper limit value βnew<the necessary drive force βncs" may be satisfied. Therefore, if the state determining portion 80 determines that "the current upper limit value βcur<the necessary drive force βncs<the new upper limit value βnew" is not satisfied and determines that "the necessary drive force βncs<the current upper limit value βcur" is not satisfied, the upper limit value setting portion 78 may forcibly change the gearshift position of the automatic transmission 22 although the upper limit value β is basically changed from the current upper limit value βcur to the new upper limit value βnew.

Figure 9:
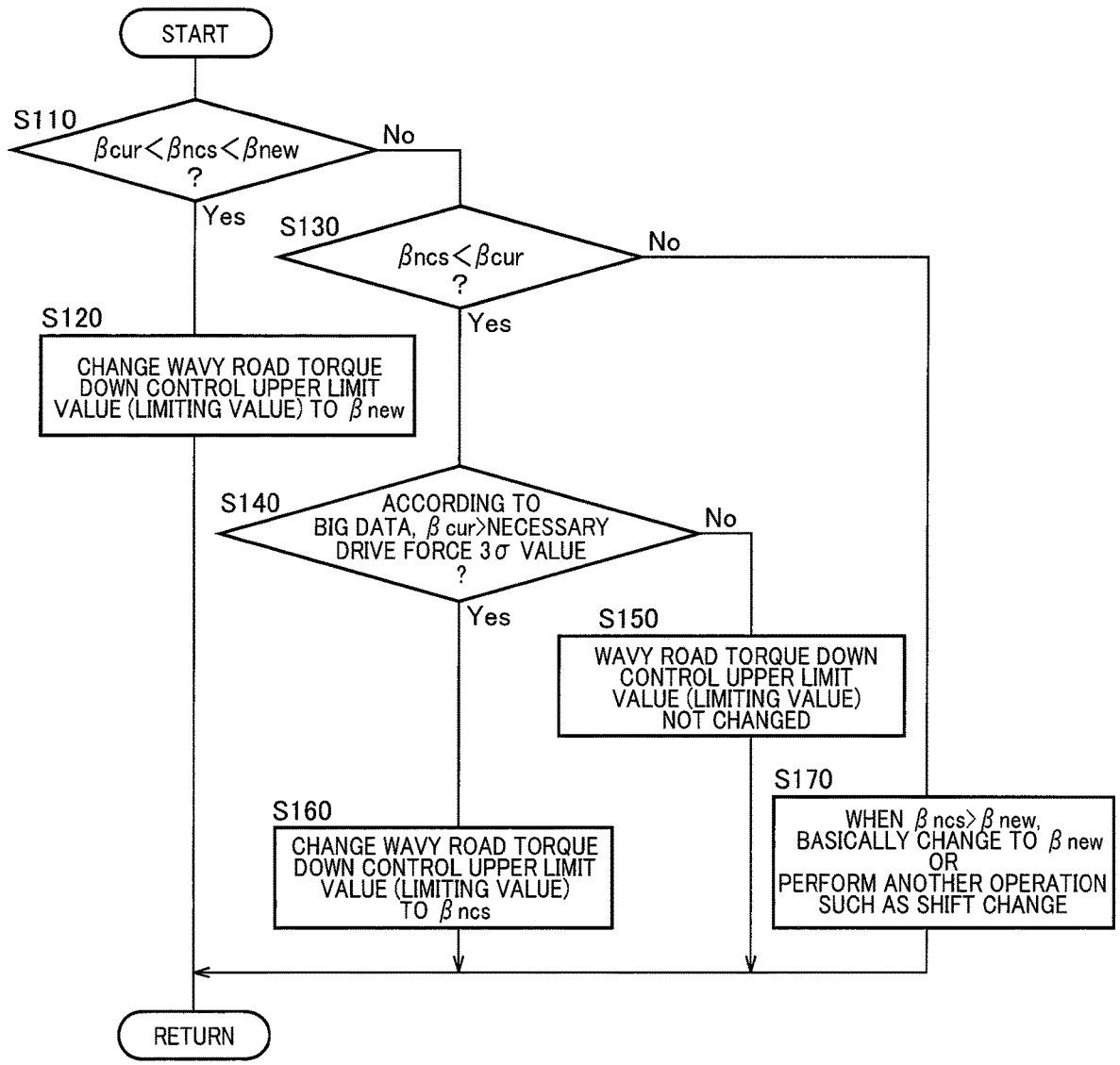
FIG. 9 is a flowchart for explaining a main portion of the control operation of the electronic control device, i.e., a flow chart for explaining the control operation for ensuring the power performance while suppressing an excessive input to the drive system components, the mounts, etc. regardless of the location of the wavy road.

FIG. 9 is a flowchart for explaining a main portion of the control operation of the electronic control device 70, i.e., a flow chart for explaining the control operation for ensuring the power performance while suppressing an excessive input to the drive system components, the mounts, etc. regardless of the location of the wavy road, and is repeatedly executed, for example.

In FIG. 9, first, at S110 corresponding to the function of the state determining portion 80, it is determined whether "the current upper limit value βcur<the necessary drive force βncs<the new upper limit value βnew" is satisfied. If the determination of S110 is affirmative, the upper limit value β during limitation of the drive force Fd on the wavy road is changed from the current upper limit value βcur to the new upper limit value βnew at S120 corresponding to the function of the upper limit value setting portion 78. If the determination of S110 is negative, it is determined at S130 corresponding to the function of the state determining portion 80 whether "the necessary drive force βncs<the current upper limit value βcur" is satisfied. If the determination of S130 is affirmative, it is determined at S140 corresponding to the function of the state determining portion 80 whether "the current upper limit value βcur>the value three times the standard deviation σ of the necessary drive force βncs" is satisfied. If the determination of S140 is negative, the upper limit value β is not changed from the current upper limit value βcur at S150 corresponding to the function of the upper limit value setting portion 78. If the determination of S140 is affirmative, the upper limit value β is changed from the current upper limit value βcur to the necessary drive force βncs at S160 corresponding to the function of the upper limit value setting portion 78. If the determination of S130 is negative, the upper limit value β is basically changed from the current upper limit value βcur to the new upper limit value βnew at S170 corresponding to the function of the upper limit value setting portion 78. Alternatively, another operation such as the shift control of changing the gearshift position of the automatic transmission 22 (=shift change) may be performed.

In this example, the same electronic control devices as the electronic control device 70 mounted on the vehicle 10 and the electronic control devices 70 mounted on the other vehicles 110 and the center 100 can each be considered as a device constituting a system 200 for reducing input during running on a wavy road (see FIG. 1) used for the multiple vehicles including the vehicle 10 and the other vehicles 110.

As described above, according to this example, when the vehicle 10 is running on a wavy road and the NT variation component integrated value bpstotal is equal to or greater than the resonance determination value α, the drive force Fd of the vehicle 10 is limited by the upper limit value β, and therefore, the input of excessive torque from the drive wheels 14 is suppressed. Additionally, since the upper limit value β is set to a value corresponding to the wavy road where the vehicle is currently running based on the position information Ivp, an inappropriate reduction or excessive reduction in the drive force Fd is suppressed when the drive force Fd is limited. Therefore, the power performance can be ensured while the excessive input to the drive system components, the mounts, etc. is suppressed regardless of the location of the wavy road.

According to this example, the upper limit value β is set to the value of the drive force Fd at which the NT variation component integrated value bpstotal is the resonance determination value α on the wavy road line LW in the location where the vehicle 10 is currently running, among the wavy road lines LW predefined for respective locations where the wavy road exists, and therefore, the upper limit value β is appropriately set to a value corresponding to the wavy road where the vehicle is currently running.

According to this example, the wavy road lines LW are predefined based on the NT variation component integrated value bpstotal, the drive force Fd, and the position information Ivp acquired through respective communications from each of multiple vehicles including the vehicle 10 and the other vehicles 110 in the center 100, and therefore, the upper limit value β corresponding to the wavy road is appropriately set by using the wavy road lines LW.

According to this example, since the upper limit value β is set in consideration of the necessary drive force βncs predefined by the center 100 for each of the locations where the wavy road exists, an inappropriate reduction or excessive reduction in the drive force Fd is suppressed when the drive force Fd is limited.

According to this example, the NT variation component integrated value bpstotal is a value obtained by integrating the absolute value of the NT variation component BPF(Nt), which is the variation component in the resonance frequency band extracted from the turbine rotation speed Nt, for a predetermined period, and therefore, an appropriate determination can be made on a state in which the drive force Fd of the vehicle 10 needs to be limited by the upper limit value β, for example, a state in which resonance is occurring.

According to this example, the same effect as described above can be obtained in the system 200 for reducing input during running on a wavy road including the electronic control device 70, the electronic control devices mounted on the other vehicles 110, and the center 100.

Another example of the present invention will be described. In the following description, the portions common to the examples are denoted by the same reference numerals and will not be described.

Example 2

Even on the same wavy road, a friction coefficient μ between a tire and a road surface changes due to a difference in weather such as fine weather, rainy weather, and an amount of rainfall in rainy weather. Therefore, the upper limit value setting portion 78 sets the upper limit value β in consideration of weather information in the location where the vehicle 10 is currently running. For example, the weather information includes the current weather, the weather in the past several hours, etc. acquired from the center 100 or a center providing the weather information. Alternatively, for example, the weather information may be acquired based on an operating state of wipers of the vehicle 10 or the other vehicles 110 near the vehicle 10.

Figure 10:
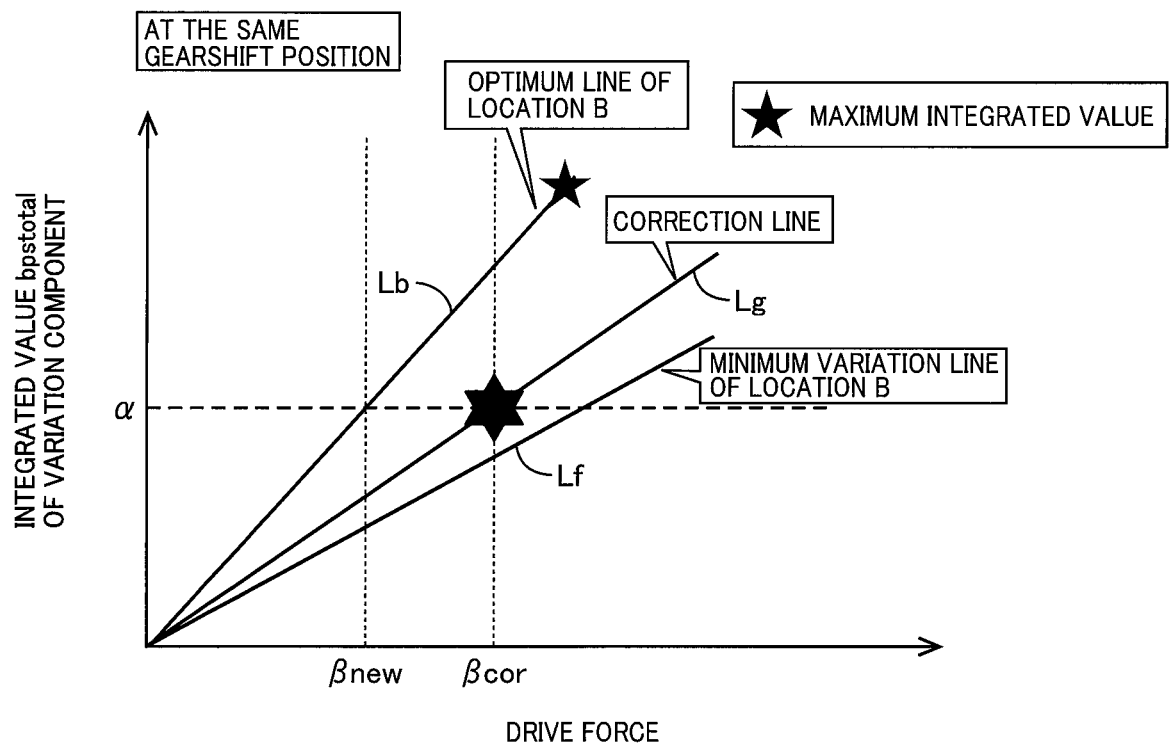
FIG. 10 is a diagram for explaining an example of correcting the upper limit value depending on the weather.

Specifically, FIG. 10 is a diagram for explaining an example of correcting the upper limit value β depending on the weather. In FIG. 10, the solid line Lb is the wavy road line LWb in the location B similar to the solid line Lb of FIG. 6. A solid line Lf is a wavy road line LWf predefined in the center 100 so that the NT variation component integrated value bpstotal becomes equal to or greater than the NT variation component integrated value bpstotal of the wavy road line LWf at any points "○" (see FIG. 6) in the location B, for example. When the vehicle 10 is running in the location B, the upper limit value setting portion 78 acquires the wavy road line LWf together with the wavy road line LWb from the center 100. The upper limit value setting portion 78 sets a correction line LWg as shown as a solid line Lg located between the wavy road line LWb and the wavy road line LWf based on the weather information, and sets the upper limit value β corrected by using the correction line LWg, i.e., a corrected upper limit value βcor.

As described above, according to this example, the same effect as Example 1 described above can be obtained. Additionally, since the upper limit value β is set in consideration of the weather information in the location where the vehicle 10 is currently running, the corrected upper limit value βcor reflecting a change in the friction coefficient 11 of the wavy road due to the weather is appropriately set.

Although the examples of the present invention have been described in detail with reference to the drawings, the present invention is also applied in other forms.

For example, in the examples, the wavy road line LW as shown in FIG. 6 may be updated for each predetermined amount of data such as the running state acquired in the center 100 or in each fixed period of time. As a result, for example, when the wavy road has changed over time due to leveling or paving, the currently set wavy road line LW not reflecting the actual road surface condition of the wavy road can be changed to the appropriate wavy road line LW.

In the examples, the wavy road line LW is determined for each location where the wavy road exists, and therefore, for example, the severity of resonance variation at each location can be ranked based on the maximum integrated value, as indicated by "Rank 1", "Rank 2", "Rank 3", and "Not Ranked" in FIG. 6, for example. As a result, the resonance determination value α can be changed, or an appropriate component can be selected in accordance with each location. For example, in the location A in FIG. 6, the severity of resonance variation is Not Ranked, i.e., the lowest, and the NT variation component integrated value bpstotal does not reach the resonance determination value α, and therefore, mounted components of vehicles for the location A can be made smaller than those of vehicles for the location B or the location C.

In the examples, the current upper limit value βcur is the upper limit value β obtained by using the original wavy road line LWe, and therefore, it is assumed that "the current upper limit value βcur<the new upper limit value βnew" is satisfied; however, the present invention is not limited to this form. For example, in the case of running in the location B while the upper limit value β obtained by using the wavy road line LWc of the location C shown as the solid line Lc in FIG. 6 is set as the current upper limit value βcur, the upper limit value β obtained by using the wavy road line LWb of the location B shown as the solid line Lb in FIG. 6 is set as the new upper limit value βnew, so that "the new upper limit value βnew<the current upper limit value βcur" is satisfied. In such a case, for example, if the state determining portion 80 determines that "the new upper limit value βnew<the current upper limit value βcur" is satisfied, the upper limit value setting portion 78 changes the upper limit value β from the current upper limit value βcur to the new upper limit value βnew.

In the examples, the drive force Fd is exemplified as a value limited by using the upper limit value β; however, the present invention is not limited to this form. The present invention is applicable, for example, even if the drive force Fd is replaced with a drive torque, a torque on the propeller shaft 26, a torque on the drive shaft 30, the output torque of the automatic transmission 22, etc. Alternatively, in an electric vehicle including an electric motor in addition to or instead of the engine 12, the drive force Fd can be replaced with an output torque of the electric motor etc. When the torque on the propeller shaft 26, the output torque of the electric motor, etc. are used, the value of the output torque of the electric motor etc. is acquired in the center 100 as a piece of the running information. Alternatively, for example, when the resonance state in wavy road running is determined in an electric vehicle by using an integrated value of a variation component of the rotation speed of the electric motor, the integrated value, the output torque of the electric motor, and the position information Ivp are acquired in the center 100 to set the wavy road line LW. Alternatively, in a vehicle without a fluid transmission device such as the torque converter 20, for example, the resonance state in wavy road running is determined by using an integrated value of a variation component of the input rotation speed of the transmission etc., and the integrated value, the drive force Fd, and the position information Ivp are acquired in the center 100 to set the wavy road line LW. The value representing the variation of the predetermined rotation speed used for determining the resonance state in wavy road running may be a moving average obtained by dividing the integrated value of the variation component of the predetermined rotation speed such as the NT variation component integrated value bpstotal by the number of integrated samples. Alternatively, for example, the resonance state in wavy road running may be determined based on the magnitude of the variation component of the predetermined rotation speed.

The above description is merely an embodiment and the present invention can be implemented in variously modified and improved forms based on the knowledge of those skilled in the art.

REFERENCE SIGNS LIST

10: vehicle
12: engine (power source)
14: drive wheels
16: power transmission device
70: electronic control device (control device)
76: drive force limiting portion
78: upper limit value setting portion
100: center (external device)
110: other vehicles
200: system for reducing input during running on a wavy road

What is claimed is:

1. A control device of a vehicle including a power transmission device transmitting a power of a power source to drive wheels, the control device comprising:
   a drive force limiting portion limiting a drive force of the vehicle by an upper limit value when the vehicle is running on a wavy road and a value representing a variation in a predetermined rotation speed of a drive system component disposed between the power source to the drive wheels is equal to or greater than a resonance determination value; and
   an upper limit value setting portion setting the upper limit value to a value corresponding to the wavy road on which the vehicle is currently running, based on current position information indicative of a current position of the vehicle,
   wherein the upper limit value setting portion sets, as the upper limit value, a value of the drive force at which the value representing a variation in the predetermined rotation speed is the resonance determination value in a predetermined characteristic corresponding to a location where the vehicle is currently running, among predetermined characteristics predefined for respective locations where the wavy road exists and indicative of a relationship between the value representing a variation in the predetermined rotation speed and the drive force.

2. The control device of a vehicle according to claim 1, wherein the predetermined characteristics are predefined based on the values representing variations in the predetermined rotation speed of drive system components of multiple vehicles including the vehicle and a vehicle other than the vehicle, the drive forces of the multiple vehicles, and the current position information, acquired through respective communications from the multiple vehicles in an external device separated from the vehicle.

3. The control device of a vehicle according to claim 2, wherein the upper limit value setting portion sets the upper limit value in consideration of a necessary drive force predefined based on the drive forces of the multiple vehicles and longitudinal accelerations of the multiple vehicles acquired through respective communications from the multiple vehicles in the external device.

4. The vehicle control device according to claim 1, wherein the upper limit value setting portion sets the upper limit value in consideration of weather information of a location where the vehicle is currently running.

5. The vehicle control device according to claim 2, wherein the upper limit value setting portion sets the upper limit value in consideration of weather information of a location where the vehicle is currently running.

6. The vehicle control device according to claim 3, wherein the upper limit value setting portion sets the upper limit value in consideration of weather information of a location where the vehicle is currently running.

7. The vehicle control device according to claim 1, wherein the value representing a variation in the predetermined rotation speed is a value obtained by integrating an absolute value of a variation component of the predetermined rotation speed in a resonance frequency band extracted from the predetermined rotation speed for a predetermined period.

8. The vehicle control device according to claim 2, wherein the value representing a variation in the predetermined rotation speed is a value obtained by integrating an absolute value of a variation component of the predetermined rotation speed in a resonance frequency band extracted from the predetermined rotation speed for a predetermined period.

9. The vehicle control device according to claim 3, wherein the value representing a variation in the predetermined rotation speed is a value obtained by integrating an absolute value of a variation component of the predetermined rotation speed in a resonance frequency band extracted from the predetermined rotation speed for a predetermined period.

10. The vehicle control device according to claim 4, wherein the value representing a variation in the predetermined rotation speed is a value obtained by integrating an absolute value of a variation component of the predetermined rotation speed in a resonance frequency band extracted from the predetermined rotation speed for a predetermined period.

11. The vehicle control device according to claim 5, wherein the value representing a variation in the predetermined rotation speed is a value obtained by integrating an absolute value of a variation component of the predetermined rotation speed in a resonance frequency band extracted from the predetermined rotation speed for a predetermined period.

12. The vehicle control device according to claim 6, wherein the value representing a variation in the predetermined rotation speed is a value obtained by integrating an absolute value of a variation component of the predetermined rotation speed in a resonance frequency band extracted from the predetermined rotation speed for a predetermined period.

13. A system for reducing input during running on a wavy road used for multiple vehicles each including a power transmission device transmitting a power of a power source to drive wheels, the system comprising:
   an external device separated from the vehicles and setting predetermined characteristics for respective locations where the wavy road exists, based on a value representing a variation in a predetermined rotation speed of a drive system component disposed between the power source to the drive wheels, a drive force of the vehicle, and current position information indicative of a current position of the vehicle acquired through respective communications from the vehicles, the predetermined characteristics indicating a relationship between the value representing a variation in the predetermined rotation speed and the drive force; and a control device mounted on the vehicle and limiting the drive force by an upper limit value when the vehicle is running on the wavy road and the value representing a variation in the predetermined rotation speed is equal to or greater than a resonance determination value, the control device setting as the upper limit value a value of the drive force at which the value representing a variation in the predetermined rotation speed is the resonance determination value in the predetermined characteristic corresponding to a location where the vehicle is currently running, among the predetermined characteristics for the respective locations.

* * * * *